United States Patent
Phifer

(10) Patent No.: US 11,104,451 B2
(45) Date of Patent: Aug. 31, 2021

(54) SYSTEMS AND METHODS FOR MITIGATING CONDENSATION IN AIRCRAFT LIGHTING

(71) Applicant: B/E AEROSPACE, INC., Winston Salem, NC (US)

(72) Inventor: Van I. Phifer, Greendale, WI (US)

(73) Assignee: B/E Aerospace, Inc, Winston Salem, NC (US)

( * ) Notice: Subject to any disclaimer, the term of this patent is extended or adjusted under 35 U.S.C. 154(b) by 0 days.

(21) Appl. No.: 16/746,464

(22) Filed: Jan. 17, 2020

(65) Prior Publication Data

US 2021/0221533 A1 Jul. 22, 2021

(51) Int. Cl.
| | |
|---|---|
| *B64D 47/02* | (2006.01) |
| *F21V 29/51* | (2015.01) |
| *F21V 29/90* | (2015.01) |
| *F21W 107/30* | (2018.01) |

(52) U.S. Cl.
CPC .............. *B64D 47/02* (2013.01); *F21V 29/51* (2015.01); *F21V 29/90* (2015.01); *F21W 2107/30* (2018.01)

(58) Field of Classification Search
CPC ........ B64D 47/02; B64D 47/04; B64D 47/06; B64D 2203/00; F21V 29/90; F21V 29/51; F21V 31/005; F21V 31/03; F21V 31/00; F21W 2107/30; F21S 45/10; F21S 45/30; F21S 45/50; F21S 45/60; F21K 9/232
See application file for complete search history.

(56) References Cited

U.S. PATENT DOCUMENTS

| | | | | |
|---|---|---|---|---|
| 2009/0101730 | A1* | 4/2009 | Davis | A61L 9/037 239/44 |
| 2009/0162253 | A1* | 6/2009 | Porchia | A61L 9/037 422/124 |
| 2011/0193462 | A1* | 8/2011 | Chang | H01L 31/00 313/46 |

(Continued)

FOREIGN PATENT DOCUMENTS

| | | | | |
|---|---|---|---|---|
| EP | 2711625 | | 3/2014 | |
| FR | 2899955 | A1 * | 10/2007 | F21S 10/00 |

(Continued)

OTHER PUBLICATIONS

Philippe, Subaquatic illumination device for use in marine environment, has dome shaped metallic cage with arch placed around transparent glass shell for protecting against impacts, and including large surface that provides large angular opening, Oct. 19, 2007, FR2899955A1 (Year: 2007).*

(Continued)

*Primary Examiner* — Jong-Suk (James) Lee
*Assistant Examiner* — James M Endo
(74) *Attorney, Agent, or Firm* — Snell & Wilmer L.L.P.

(57) ABSTRACT

An exterior lamp for an aircraft including a housing defining an interior volume, a heat source disposed within the interior volume of the housing, a light source disposed within the housing configured to emit a light therefrom, a protective lens coupled to the housing proximate the light source, wherein the protective lens is configured to transmit the light, and a capillary transport apparatus having a first end and a second end wherein the first end is coupled to the heat source and the second end is disposed in a catchment basin.

9 Claims, 2 Drawing Sheets

(56) References Cited

U.S. PATENT DOCUMENTS

| | | | | |
|---|---|---|---|---|
| 2011/0193479 A1* | 8/2011 | Nilssen | ............... | F21V 23/0492 315/35 |
| 2011/0253801 A1* | 10/2011 | Buschmann | ............ | A61L 9/127 239/44 |
| 2013/0155695 A1* | 6/2013 | Liu | ................ | F21V 29/506 362/373 |
| 2013/0162139 A1* | 6/2013 | Liu | ................ | F21V 13/02 315/51 |
| 2013/0294070 A1* | 11/2013 | Tsao | ................ | F21V 29/83 362/235 |
| 2014/0140683 A1* | 5/2014 | Stephenson | ............ | A61L 9/037 392/395 |
| 2015/0144713 A1* | 5/2015 | Formico | ............... | A01M 29/12 239/276 |
| 2015/0283281 A1* | 10/2015 | Iwaki | ................ | A61L 9/037 422/119 |
| 2015/0338171 A1* | 11/2015 | Torres Sep Iveda | ... | F28D 15/04 165/104.26 |
| 2017/0027053 A1* | 1/2017 | Moczygemba | ......... | F25B 21/02 |
| 2017/0138584 A1* | 5/2017 | Hessling-Von Heimendahl | ......... | B64D 47/06 |
| 2017/0211795 A1* | 7/2017 | Kadijk | ................ | F21K 9/237 |
| 2018/0177077 A1* | 6/2018 | Shioga | ................ | H01L 23/427 |
| 2018/0245784 A1* | 8/2018 | De Graaf | ................ | F21K 9/23 |
| 2019/0078830 A1 | 3/2019 | Christian et al. | | |
| 2020/0094986 A1* | 3/2020 | Hessling-Von Heimendahl | ......... | B64D 47/04 |

FOREIGN PATENT DOCUMENTS

| | | |
|---|---|---|
| KR | 20020083827 | 11/2002 |
| WO | 2019022621 | 1/2019 |

OTHER PUBLICATIONS

European Patent Office, European Search Report dated Apr. 23, 2021 in Application No. 21151693.5.

* cited by examiner

SYSTEMS AND METHODS FOR MITIGATING CONDENSATION IN AIRCRAFT LIGHTING

FIELD

The present disclosure relates generally to aircraft systems and, more particularly, to aircraft exterior lighting systems.

BACKGROUND

Aircraft exterior lights are expected to endure a wide range of atmospheric and environmental conditions including combinations of temperature, pressure, humidity, and exposure to liquid water such as rain. Operating conditions of aircraft exterior lights may tend to promote condensation of liquid water within the light unit housing. Condensation within the light unit is undesirable, tending to reduce emissivity of lighting elements and promote electrical malfunctions.

SUMMARY

In various embodiments, an exterior lamp for an aircraft comprises a housing defining an interior volume, a heat source disposed within the interior volume of the housing, a light source disposed within the housing configured to emit a light therefrom, a protective lens coupled to the housing proximate the light source, wherein the protective lens is configured to transmit the light, and a capillary transport apparatus having a first end and a second end, wherein the first end is coupled to the heat source and the second end is disposed in a catchment basin.

In various embodiments, the catchment basement is defined by the protective lens. In various embodiments, the heat source is a driver board configured to drive the light source. In various embodiments, the first end is coupled to a heat sink of the driver board. In various embodiments, the protective lens encloses a reflector wherein the second end of the capillary transport apparatus extends through the reflector into the catchment basin. In various embodiments, a vapor permeable membrane is in fluid communication between the interior volume of the housing and an exterior of the housing. In various embodiments, the capillary transport apparatus comprises one of a wick, a woven material, a fibrous material, or a braided material In various embodiments, an article of manufacture is disclosed comprising a housing defining an interior volume a heat source disposed within the interior volume of the housing, and a capillary transport apparatus having a first end and a second end, wherein the first end is coupled to the heat source and the second end is disposed in a catchment basin.

In various embodiments, the catchment basin is defined by the housing. In various embodiments, a light source is disposed within the housing and configured to emit a light. In various embodiments, a protective lens is configured to transmit the light from the light source. In various embodiments, the catchment basin is defined by the protective lens. In various embodiments, the heat source is a driver board configured to drive the light source. In various embodiments, the first end is coupled to a heat sink of the driver board. In various embodiments, the protective lens encloses a reflector, wherein the second end of the capillary transport apparatus extends through the reflector. In various embodiments, the capillary transport apparatus is coupled to the heat source by bonding. In various embodiments, the capillary transport apparatus is coupled to the heat source by a friction coupling. In various embodiments, the capillary transport apparatus comprises one of a wick, a woven material, a fibrous material, or a braided material. In various embodiments, a vapor permeable membrane is in fluid communication between the interior volume of the housing and an exterior of the housing.

In various embodiments, a method of mitigating condensation within a housing comprises collecting a condensate within a catchment basin, wicking the condensate from the catchment basin to a heat source, evaporating the condensate to generate a vapor, and diffusing the vapor through a transport path in fluid communication with an interior volume of the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option.

Additionally, any reference to without contact (or similar phrases) may also include reduced contact or minimal contact. Surface shading lines may be used throughout the figures to denote different parts but not necessarily to denote the same or different materials.

Figure 1:
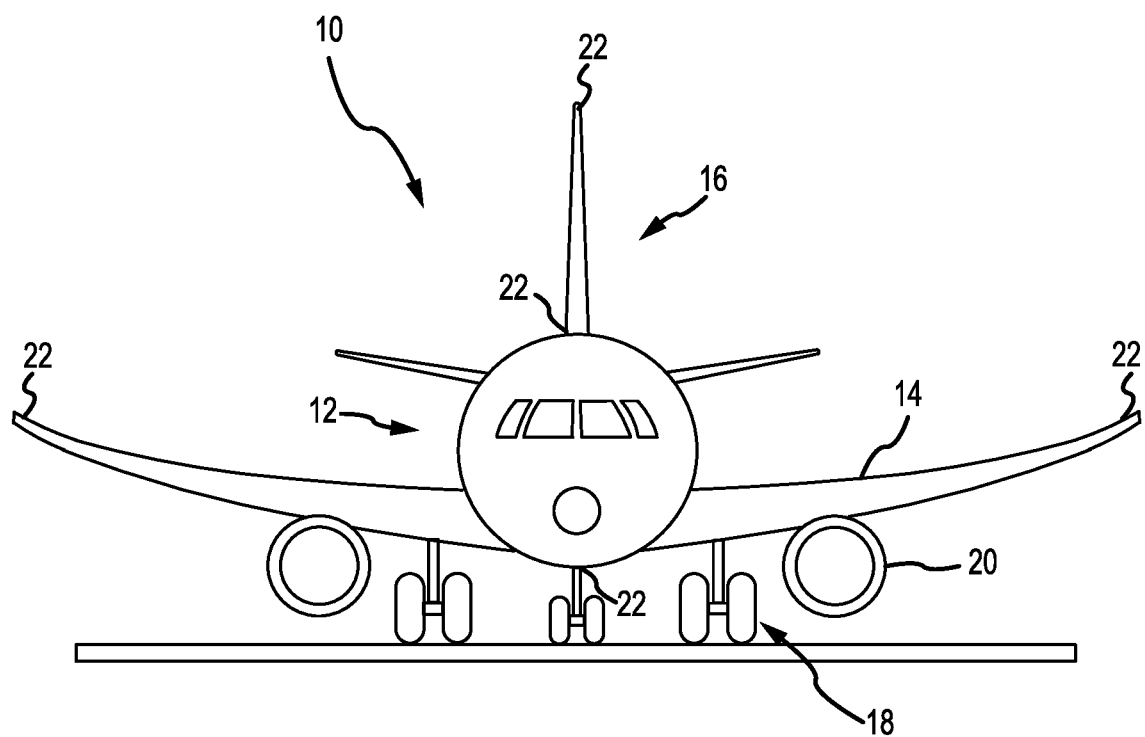
FIG. 1 illustrates an exemplary aircraft, in accordance with various embodiments.
Figure 1:
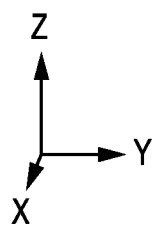

With reference to FIG. 1, an aircraft 10 is illustrated in accordance with various embodiments. Aircraft 10 comprises a fuselage 12, wings 14, empennage 16, landing gear 18, a propulsion system, such as gas turbine engines 20, and a plurality of exterior lights 22. Exterior lights 22 may include any number of lights know to those skilled in the art such as, for example, navigation lights, logo lights, wing scan lights, runway turnoff lights, cargo loading lights, engine scan lights, anti-collision strobe lights, beacon lights, and/or the like. It will be appreciated that the number and location of the exterior lights 22 are exemplary and aircraft 10 may include any number of additional lights which may be beneficial to operation of aircraft 10 but are not illustrated.

Figure 2:
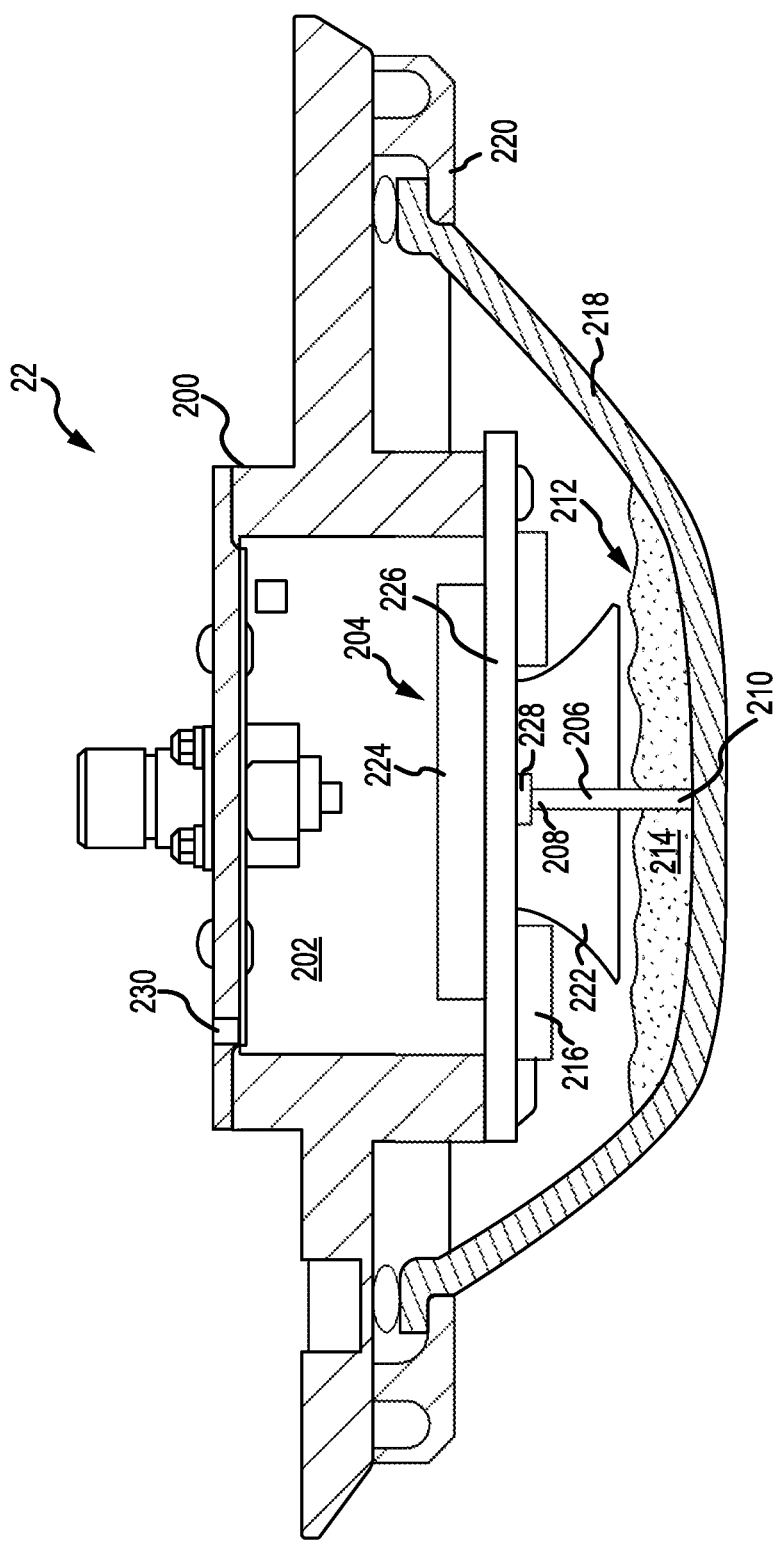
FIG. 2 illustrates an exterior lamp for an aircraft, in accordance with various embodiments.

With additional reference to FIG. 2, interior details of exterior light 22 are illustrated in schematic cross section according to various embodiments. Exterior light 22 may comprise a housing 200 defining an interior volume 202. Exterior light 22 incudes a light source 216 configured to emit a light such as, for example, an array of light emitting diodes (LEDs). A heat source 204 is disposed within the interior volume 202 of the housing 200. A capillary transport apparatus 206 may be coupled to the heat source 204. The capillary transport apparatus 206 may be coupled to the heat source 204 at a first end 208. A second end 210 of the capillary transport apparatus 206 may extend into a catchment basin 212. The capillary transport apparatus 206 may be coupled by one of bonding, staking, pinning, or by a friction coupling 228 such as, for example, one of a clamp, a ferrule, a crimp, and/or the like. In various embodiments, the catchment basin 212 may be defined by the housing 200. In various embodiments and in response to changes in environmental conditions, a condensate 214 may form within the interior volume 202 of housing 200 and tend to collect within the catchment basin 212. In various embodiments, the capillary transport apparatus 206 may comprise one of a wick, a woven material, a fibrous material, a braided material, or any other sort of material understood to promote capillary transportation of the condensate from the catchment basin 212 toward the heat source 204.

In various embodiments, the light source 216 may be protected by a protective lens 218 configured to emit the light from the light source 216. In various embodiments, the protective lens may be sealed to the housing 200 such as, for example, by a seal ring 220. In various embodiments, the protective lens 218 may define the catchment basin 212. In various embodiments, the protective lens 218 may enclose a reflector 222 configured to reflect the light from the light source 216. The reflector 222 may have an annular structure and the second end 210 of the capillary transport apparatus 206 may extend through an annulus of the reflector 222. In various embodiments, a driver board 224 may be configured to drive the light source 216. The driver board 224 may comprise the heat source 204 and may be coupled to a heat sink 226 which may tend to receive thermal energy from the heat source 204. In various embodiments, the first end 208 of the capillary transport apparatus 206 may be coupled to the heat sink 226.

In this regard, the condensate 214 may tend to collect in the catchment basin 212 and be wicked by the capillary transport apparatus 206 from the catchment basin 212 toward the heat source 204. The heat source 204 may tend to evaporate the condensate 214 to generate a vapor which may diffuse throughout the interior volume 202 of the housing 200. In various embodiments, the housing 200 may comprise a vapor permeable membrane 230 in fluid communication between the interior volume 202 and the external environment (i.e., the exterior of the housing 200). In this regard, the housing 200 includes a transport path for the vapor to diffuse from the interior volume 202 of the housing 200 and thereby exit the housing 200. In various embodiments, the seal ring 220 may comprise a vapor permeable membrane. In this regard, the evaporated vapor may tend to diffuse through the vapor permeable membrane 230 and thereby exit the exterior light 22.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture, comprising:
a housing defining an interior volume;
a heat source disposed within the interior volume of the housing;
a light source within the housing;
a protective lens coupled to the housing and enclosing a reflector;
a vapor permeable membrane in fluid communication between the interior volume of the housing and an exterior of the housing; and
a capillary transport apparatus comprising a wick having a first end and a second end,
wherein the first end is coupled to a heat sink of the heat source and the second end is disposed in a catchment basin defined by the protective lens.

2. The article of manufacture of claim 1, wherein the heat source is a driver board configured to drive the light source.

3. The article of manufacture of claim 1, wherein the second end of the capillary transport apparatus extends through the reflector.

4. The article of manufacture of claim 1, wherein the capillary transport apparatus is coupled to the heat source by bonding.

5. The article of manufacture of claim 1, wherein the capillary transport apparatus is coupled to the heat source by a friction coupling.

6. The article of manufacture of claim 1, wherein the capillary transport apparatus comprises one of a woven material, a fibrous material, or a braided material.

7. An exterior lamp for an aircraft, comprising:
a housing defining an interior volume;
a heat source disposed within the interior volume of the housing;
a light source disposed within the housing configured to emit a light therefrom;
a protective lens coupled to the housing proximate the light source, wherein the protective lens is configured to transmit the light;
a vapor permeable membrane in fluid communication between the interior volume of the housing and an exterior of the housing; and
a capillary transport apparatus comprising a wick having a first end and a second end,
wherein the first end is coupled to the heat source and the second end is disposed in a catchment basin,
wherein the catchment basin is defined by the protective lens,
wherein the heat source is a driver board configured to drive the light source,
wherein the first end is coupled to a heat sink of the driver board,
wherein the protective lens encloses a reflector, wherein the second end of the capillary transport apparatus extends through the reflector into the catchment basin.

8. The exterior lamp of claim 7, wherein the capillary transport apparatus comprises one of a woven material, a fibrous material, or a braided material.

9. A method of mitigating condensation within a housing, comprising:
collecting a condensate within a catchment basin;
wicking the condensate from the catchment basin toward a heat source via a capillary transport apparatus comprising a wick having a first end and a second end, wherein the first end is coupled to a heat sink of the heat source and the second end is disposed in the catchment basin;
evaporating the condensate to generate a vapor; and
diffusing the vapor through a vapor permeable membrane in fluid communication between an interior volume of the housing and an exterior of the housing,
wherein the heat source and a light source are disposed within the housing,
wherein a protective lens is coupled to the housing and encloses a reflector, and
wherein the protective lens defines the catchment basin.

* * * * *